United States Patent
Fonseca, Jr. et al.

(10) Patent No.: US 6,735,417 B2
(45) Date of Patent: May 11, 2004

(54) METHOD AND APPARATUS FOR RELAYING INFORMATION IN AN AD-HOC NETWORK

(75) Inventors: Benedito Fonseca, Jr., Schaumburg, IL (US); Jeffrey D. Bonta, Arlington Heights, IL (US); George Calcev, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 51 days.

(21) Appl. No.: 10/219,900

(22) Filed: Aug. 15, 2002

(65) Prior Publication Data

US 2004/0033778 A1 Feb. 19, 2004

(51) Int. Cl.[7] .................................................. H04B 7/15
(52) U.S. Cl. ...................... 455/11.1; 455/445; 455/574; 370/238
(58) Field of Search ................................ 455/11.1, 500, 455/502, 445, 572, 574; 370/408, 338, 238; 709/230, 238

(56) References Cited

U.S. PATENT DOCUMENTS

2001/0018336 A1 * 8/2001 Okajima et al. ............ 455/403
2002/0013856 A1 * 1/2002 Garcia-Luna-Aceves et al. ...... 709/238
2002/0049561 A1 * 4/2002 Garcia-Luna-Aceves et al. ...... 702/182
2003/0045295 A1 * 3/2003 Stanforth .................... 455/445
2003/0165117 A1 * 9/2003 Garcia-Luna-Aceves et al. 370/238
2003/0202524 A1 * 10/2003 Conner et al. ............... 370/408
2003/0214921 A1 * 11/2003 Alapuranen et al. ......... 370/328

FOREIGN PATENT DOCUMENTS

| WO | WO 01/20928 A1 | 9/1999 |
| WO | WO 01/31945 A1 | 10/1999 |
| WO | WO 01/47181 A2 | 12/1999 |
| WO | WO 01/84870 A1 | 5/2000 |
| WO | WO 00/54539 | 9/2000 |

* cited by examiner

*Primary Examiner*—Nay Maung
*Assistant Examiner*—Edan Orgad
(74) *Attorney, Agent, or Firm*—Kenneth A. Haas

(57) ABSTRACT

Mitigation of battery consumption will occur by prioritizing those units utilized for relay purposes. The prioritization scheme favors actively transmitting units over inactive units. In yet another embodiment, those units using real-time services are prioritized over active units using non-real time services.

10 Claims, 2 Drawing Sheets

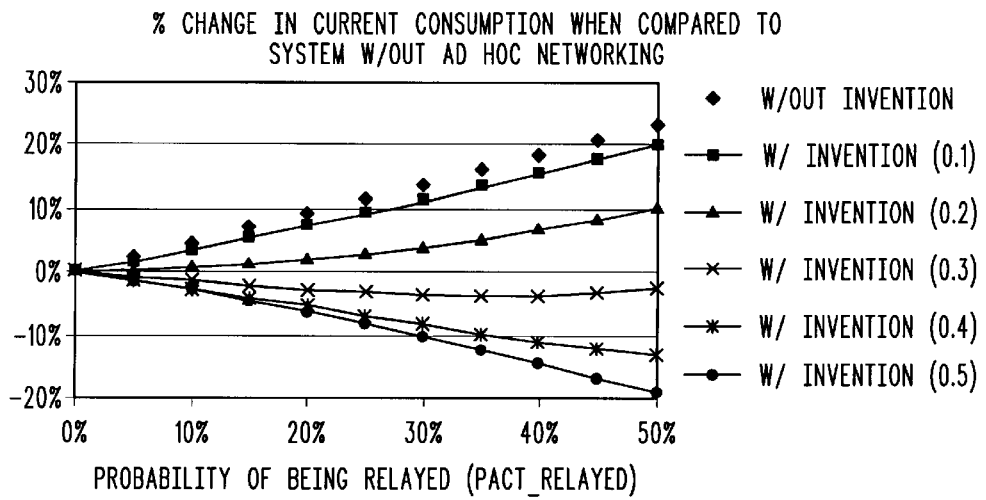
FIG. 3
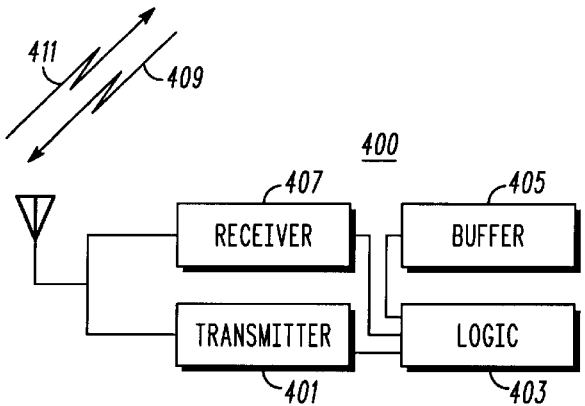
FIG. 4
FIG. 5
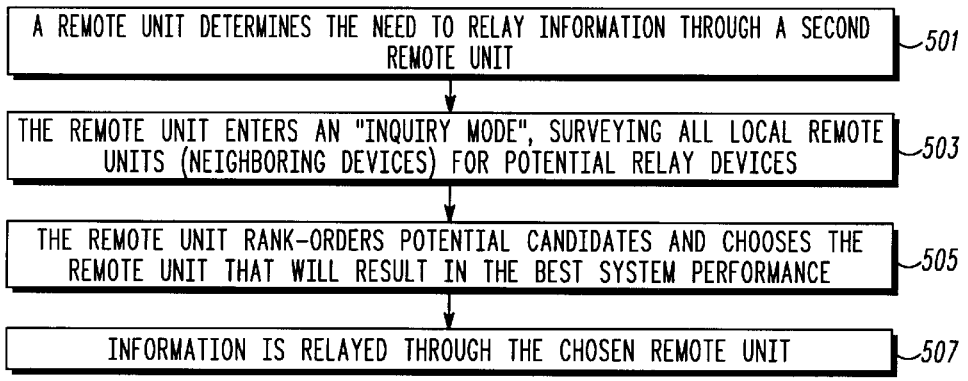

METHOD AND APPARATUS FOR RELAYING INFORMATION IN AN AD-HOC NETWORK

FIELD OF THE INVENTION

The present invention relates generally to communication systems and in articular, to a method and apparatus for relaying information in ad-hoc networks.

BACKGROUND OF THE INVENTION

A communication system may use ad-hoc networking to improve its performance. As described in the international application published under the Patent Cooperation Treaty, publication number WO 00/54539, ROUTING IN A MULTI-STATION NETWORK, which is incorporated by reference herein, increased coverage reliability and increased throughput are some of the benefits of using ad-hoc networking. In cellular communication systems utilizing ad-hoc networking, cellular handsets are equipped to operate in both the cellular and ad-hoc networks. Users access the cellular infrastructure through the ad-hoc network whenever they cannot access the cellular network directly, or when they find it more advantageous to do so. Using an ad-hoc air interface, such users transmit to another user, which forwards (relays) the transmission to the infrastructure through the cellular air interface. Such a system is shown in FIG. 1.

As shown, remote (or mobile) unit 102 existing within area 101 is unable to communicate directly with infrastructure equipment 106. By utilizing ad-hoc networking, remote unit 102 communicates with remote unit 104 (via ad-hoc air interface 103). Remote unit 104 then relays the communication to infrastructure 106 via air interface 105.

Because a mobile unit that is acting as a relay to other mobiles is consuming its battery reserve, there is a general concern that users would be unwilling to act as a relay if battery consumption is too great. This would hinder the development of ad-hoc networking in cellular systems. Therefore, a need exists for a method and apparatus for relaying communications within an ad-hoc network that reduces the amount of battery consumption for those remote units relaying communications.

BRIEF DESCRIPTION OF THE DRAWINGS

FIG. 3 is a graph illustrating current drain for a communication system utilizing ad-hoc networking to reduce average battery consumption.

FIG. 4 is a block diagram of a mobile unit in accordance with the preferred embodiment of the present invention.

FIG. 5 is a flow chart showing operation of the mobile unit of FIG. 2 in accordance with the preferred embodiment of the present invention.

DETAILED DESCRIPTION OF THE DRAWINGS

Figure 1:
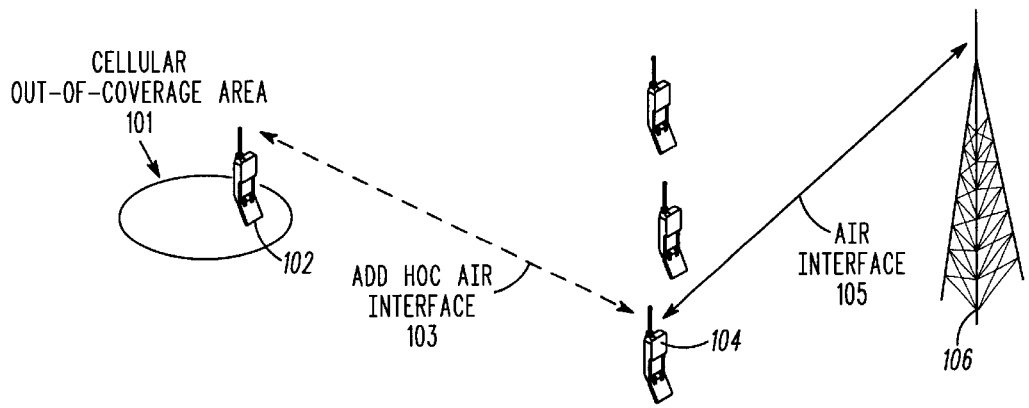
FIG. 1 is a block diagram of an ad-hoc communication system.

To address the need for routing communications within an ad-hoc network that reduces the amount of battery consumption, a method and apparatus for routing such communications is provided herein. In accordance with the preferred embodiment of the present invention mitigation of battery consumption will occur by prioritizing those units utilized for relay purposes. The prioritization scheme favors actively transmitting units over inactive units. In yet another embodiment, those units using real-time services are prioritized over active units using non-real time services. As will be shown below, by using actively transmitting units as relays as a first choice, battery consumption of the network as a whole can be greatly reduced. Thus, by avoiding relaying through inactive units, one can reduce the average current consumption in cellular handsets operating in the system.

The present invention encompasses a method for relaying information in an ad-hoc network. The method comprises the steps of identifying a plurality of devices that can serve as relay devices and identifying attributes for the plurality of devices. Based on the attributes, a device that will result in a best system performance is determined as the relay device and is utilized for relaying the information.

The present invention additionally encompasses a method comprising the steps of identifying a plurality of devices that can serve as an ad-hoc relay, identifying which of the plurality of devices is actively transmitting, and utilizing a device that is actively transmitting for the ad-hoc relay.

The present invention additionally encompasses an apparatus comprising logic circuitry utilized for identifying a plurality of devices that can serve as an ad-hoc relay, identifying which of the plurality of devices is actively transmitting, and choosing an actively-transmitting device to act as the ad-hoc relay. The apparatus additionally comprises a transmitter for sending information to the actively-transmitting device utilizing a first over-the-air protocol, causing the actively-transmitting device to transmit the information to infrastructure equipment utilizing a second over-the-air protocol.

The present invention additionally encompasses an apparatus comprising logic circuitry utilized for identifying a plurality of devices that can serve as an ad-hoc relay, identifying a plurality of attributes for the identified devices, and choosing a device to act as the ad-hoc relay based on the identified attributes, wherein the device chosen maximizes system performance. The apparatus additionally comprises a transmitter for sending information to the device utilizing a first over-the-air protocol, causing the device to transmit the information to infrastructure equipment utilizing a second over-the-air protocol.

Prior to describing ad-hoc routing in accordance with the preferred embodiment of the present invention, the following text and equations are provided to set the necessary background for utilization of the preferred embodiment of the present invention.

Considering the average active current consumption of the cellular device, this current can be represented by the equation below.

$$E[I] = \qquad\qquad\qquad\qquad\qquad\qquad\qquad\qquad (I)$$

$$(1 - P_{\text{act\_relayed}}) \cdot \lfloor (1 - P_{\text{act\_relaying}}) \cdot I_{direct} + P_{\text{act\_relaying}} \cdot I_{\text{act\_relaying}} \rfloor +$$

$$P_{\text{act\_relayed}} \cdot I_{\text{act\_relayed}} + \frac{P_{inactive}}{P_{active}} \cdot P_{\text{inact\_relaying}} \cdot I_{\text{inact\_relaying}}$$

Where:

$E[I]$ is the expected average current consumption of a given cellular device while active. This average directly relates to the talk-time of a cellular device;

$P_{\text{act\_relayed}}$ is the probability that this device is being relayed by -continued another device;

$I_{act\_relayed}$ is the current consumed while being relayed;

$P_{act\_relaying}$ is the probability that an active device is relaying messages from another device;

$I_{act\_relaying}$ is the current consumed by an active cellular device that is communicating directly with the base station and is relaying messages from another cellular device;

$I_{direct}$ is the current consumed when the cellular device communicates directly with the base station and is not relaying messages from any cellular device;

$P_{inactive}$ is the ratio of time that the given device is in inactive state (i.e., not carrying any communication from its owner);

$P_{active}$ is the ratio of time that the given device is in active state;

$P_{inact\_relaying}$ is the probability that the given cellular device is relaying messages from another device while it is in inactive state;

$I_{inact\_relaying}$ is the current consumed by the inactive cellular device while relaying messages from another cellular device; and $\frac{P_{inactive}}{P_{active}} \cdot P_{inact\_relaying} \cdot I_{inact\_relaying}$ represents the impact of inactive relaying in the average active current consumption Using the representation above, in the preferred embodiment of the present invention $P_{act\_relaying}$ is increased while decreasing $P_{inact\_relaying}$. Intuitively, note that the additional current consumption required by a relay which is already active, is far less than the additional current required by the unit which is inactive and needs to power its transmitter to perform the relay function. Thus, by avoiding relaying through inactive units, one can reduce the average current consumption in cellular handsets operating in the system. Another way to intuitively see the benefit of utilizing active transmitters as relay stations is to consider 20 active users in a cell. If 5 inactive users are relaying communication from 5 active users, there actually exists 25 cellular devices consuming battery resources. However, if these 5 active users were being relayed by 5 other active users, the number of cellular devices consuming battery resources would simply be 20.

In order to provide quantitative measures by avoiding relaying through inactive units, equation (1) can be evaluated for both relaying through active as well as inactive users. In order to simplify the model, a uniform random distribution of active and inactive users in the cell area is considered.

The following are sample average values for $I_{direct}$, $I_{act\_relaying}$, $I_{act\_relayed}$, and $I_{inact\_relaying}$.

$I_{direct}$=260 mA
$I_{act\_relaying}$=375 mA (1 message being relayed)
$I_{act\_relayed}$=70 mA
$I_{inact\_relaying}$=315 mA (1 message being relayed)

Given N users being relayed, per the prior art, active units are given as much consideration when relaying as any inactive unit so $P_{act\_relaying}$ and $P_{inact\_relaying}$ is given by:

$$P_{act\_relying}=P_{inact\_relaying}=[1-(1-P_{inrange} \cdot P_{selected})^N],$$

where
$P_{inrange}$ is the chance that one of the N users can reach the given relay candidate.

Given the maximum distance ($R_{max\_BT}$) between relay and relayed units, this probability can be approximated by the ratio $(R_{max\_BT}/R_{max\_3G})^2$, where $R_{max\_3G}$ is the cell radius. $P_{selected}$ is the chance that the given relay candidate will be chosen among all other relay candidates. Without relaying specifically through active users, this probability is approximated by the inverse of the number of relay candidates, which is equal to the number of inactive and available active units inside the circle area with radius $R_{max\_BT}$.

However, by relaying only through active users, $P_{act\_relaying}$ is increased and $P_{inact\_relaying}$ is decreased. $P_{act\_relaying}$ is still given by the equation above, but $P_{selected}$ is the inverse of the number of only active relay candidates inside the area with radius $R_{max\_BT}$. $P_{inact\_realying}$ is given by:

$$P_{inact\_relaying}=[1-(1-P_{no\_act} \cdot P_{inrange} \cdot P_{selected})^N],$$

where
$P_{no\_act}$ represents the chance that no active relay candidates are available to serve a given user seeking to be relayed, which can be approximated by:

$$P_{no\_act} = \left[1 - \left(\frac{R_{max\_BT}}{R_{max\_3G}}\right)^2\right]^{N_{act}},$$

where $N_{act}$ is the number of active relay candidates in the system. Note that the above formulation means that inactive relay candidates will only be selected if no active relay units are inside the area with radius $R_{max\_BT}$.

Figure 2:
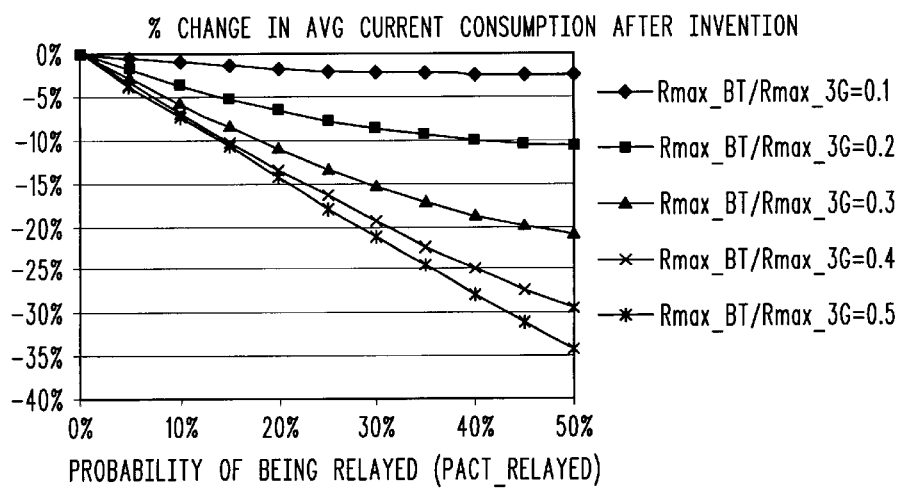
FIG. 2 is a graph comparing prior art ad-hoc networking with an ad-hoc network operated in accordance with the preferred embodiment of the present invention.

Using the above formulation, FIG. 2 compares prior art ad-hoc networking with an ad-hoc network operated in accordance with the preferred embodiment of the present invention. In particular, FIG. 2 shows the percentage reduction in the average current consumption for different values of $P_{relayed}$ and several ratios of $R_{max\_BT}/R_{max\_3G}$.

The results consider a uniform user density of 21242 users/sq km, with an average of 3% active users.

The results show that the average current consumption reduces as the number of users being relayed increases, as expected. In a scenario with voice users, 100-meter cells, 667 users per cell (20 active), in-building propagation models and 50% users seeking relay, computer simulations show a 26% reduction in the average current consumption, in line with the analytical approximation.

The results above consider 3% of active users. The benefit is increased when the percentage of active users is increased. Similarly, the benefit increases as the user density increases for a given ratio of active users.

Average current drain is not only reduced when compared against prior art, but using active users as relays also allows reduction of average current consumption when compared to cellular systems without ad hoc networking. FIG. 3 illustrates this benefit for different $R_{max\_BT}/R_{max\_3G}$ ratios. Note that, without strictly using active users as relays, the implementation of ad hoc networking would cause an increase in the average current consumption. Using technologies that allow $R_{max\_BT}/R_{max\_3G}$ ratios of 0.3 or more, using active users as relays actually provides a decrease in the average current consumption when compared to the cellular system without ad hoc networking. Simulation results also confirm the analytical predictions shown below, showing 13% reduction in the average current consumption (for $R_{max\_BT}/R_{max\_3G}$=0.4, and 50% users seeking relay).

FIG. 4 is a block diagram of mobile unit 400 in accordance with the preferred embodiment of the present invention. As shown, mobile unit 400 comprises transmitter 401, receiver 407, buffer 405, and logic circuitry 403. As discussed above, transmitter 401 and receiver 407 are designed to operate over both a cellular air interface (e.g., GSM, CDMA, WCDMA, . . . , etc.) and an ad-hoc networking air interface (e.g., BLUETOOTH, 802.11, . . . , etc.). As one of ordinary skill in the art will recognize, typically the cellular air interface (utilizing a cellular over-the-air protocol) serves long-range communication, while the ad-hoc air interface (utilizing an ad-hoc over-the-air protocol) serves short-range communication.

While remote unit 400 is acting as a relay, it is continuously receiving transmissions 409 from another remote unit utilizing the ad-hoc air interface and relays (prior to, or after, buffering via buffer 405) these transmissions to infrastructure equipment via uplink communication signal 411 utilizing the cellular air interface. Similarly, when remote unit 400 is relaying communication through another remote, or mobile unit, remote unit 400 is generally receiving downlink communications over the cellular air interface and transmitting uplink communications to another remote unit via the ad-hoc air interface.

During operation, logic unit 403 serves as an ad-hoc networking module that is constantly in a "standby" or low-power consumption mode. Logic unit 403 periodically enters into an "inquiry mode" (e.g., BLUETOOTH inquiry scan mode). During the inquiry mode, mobile units constantly share information with each other regarding their ability to act as a relay, or their need to be relayed. In particular, for ad-hoc networking utilizing the BLUETOOTH standard, the mobile unit will hop through frequencies sending inquiries to standby devices listening for such inquiries. When the standby device hears the inquiry, it responds with its address and timing information to enable future communications. In the preferred embodiment of the present invention the standby device will also provide information on whether or not the standby device is actively transmitting over the cellular network as well as other attributes (such as, but not limited to whether the remote unit is A/C powered, whether the remote unit has low battery reserves, . . . , etc.). When finished, the inquiring mobile will have identified a list of neighbor devices that the mobile can serve as relay devices through the ad hoc interface, along with the attributes of these mobiles. These devices then become relay candidates.

If a mobile then wishes to be relayed, logic unit 403 will choose a relay among all candidates surveyed. In the preferred embodiment of the present invention logic unit rank-orders these units in order to choose relay candidates that will result in the best system performance, which in this case comprises a relay device that has a minimum effect on overall system battery consumption. In particular, those units with low battery reserves will be placed at the bottom of the list, while those units that are A/C powered will be placed at the top of the list. Furthermore, those units that are actively transmitting will be placed higher on the list than those units that are inactive. Thus, in accordance with the preferred embodiment of the present invention, relay candidates are chosen as follows:

1. Choose unit that is A/C powered.
2. Choose unit that is actively transmitting with an established cellular connection.
3. Choose inactive unit with large battery reserves.
4. Choose unit with low battery reserves.

In a further embodiment of the present invention, the actively transmitting mobile units are further categorized with those units using real-time services preferred over those units not using real-time services. Real-time services are distinguished by transmissions that do not tolerate much delay (e.g., typical voice transmission). Non-real-time services are distinguished by transmissions that may tolerate longer delays (e.g., web browsing). In the preferred embodiment of the present invention those units using real-time services are distinguished by having its transmitter 401 either constantly activated or activated many times per second, with short time intervals between consecutive transmitter activations (e.g., typical voice transmission has a 40% duty cycle), while those using non-real-time services. are characterized by having its transmitter 401 inactive in the majority of the communication time (e.g., web browsing), in which most of the communications is directed from the infrastructure to the mobile unit. Because a remote unit looking to relay information will prioritize those units to choose as relay units, overall system battery consumption is greatly reduced.

In a further embodiment of the present invention, since the transmitter of the active unit 104 selected to be the relay may have periods of inactivity during real-time or non-real-time data transmission, non-real-time data from unit 102 may be buffered inside unit 104 in order to be transmitted coincident with data originated inside unit 104, thus avoiding an increase in the transmitter activations of unit 104, which avoids the increase in the average current consumption. Thus, a relaying remote unit will intermittently transmitting internally generated information to a first network while receiving relay information (externally generated) from a remote unit over a second network. The relay information is buffered until it is determined when the internally generated information is to be transmitted to the first network, at which time the buffered information is transmitted along with internally generated information the remote unit transmits to the first network.

In a further embodiment of the present invention, A/C powered units are categorized as permanent or temporary A/C powered units. An example of a temporary A/C powered unit is a mobile unit resting in a battery charger cradle. While it is on the cradle, it is an A/C powered unit. When it is removed from the battery charger cradle, it is battery powered. Thus, the present invention further proposes the prioritization of permanent A/C powered units over temporary A/C powered units since temporary A/C powered units may become battery powered units during a relay operation, causing additional battery consumption.

In a further embodiment of the present invention, the number of connections being relayed by an actively transmitting mobile unit is also used as an attribute to decide the relay unit.

FIG. 5 is a flow chart showing operation of the remote unit of FIG. 4 in accordance with the preferred embodiment of the present invention. The logic flow begins at step 501 where remote unit 400 determines the need to relay information through a second remote unit. The need to relay information may be due inter alia, because of an inability to communicate with the cellular system, to allow any user to benefit from the low-current consumption when being relayed, to take advantage of relays with a better channel quality, . . . , etc.

At step 503, the remote unit enters an "inquiry mode", surveying all local remote units for potential relay devices. As discussed above, in the preferred embodiment of the present invention the remote unit will determine attributes, or performance characteristics for all relay candidates. In particular, information such as whether the relay candidate is A/C powered, whether the relay candidate has an established and active connection to the infrastructure equipment, . . . , etc. will be provided to the remote unit. At step 505, the remote unit will rank-order potential candidates and choose the remote unit that will result in the best system performance. In particular, those remote units are chosen that will have a minimal effect on battery consumption for relay purposes. As discussed above, those units that are A/C powered are preferably chosen, followed by those units with an active connection to the infrastructure. At step 507, information is relayed through the chosen remote unit.

As discussed above, by prioritizing relay stations as such, current drain is not only reduced, but using active users as relays also allows reduction of average current consumption in the system as a whole when compared to cellular systems without ad hoc networking.

While the invention has been particularly shown and described with reference to a particular embodiment, it will be understood by those skilled in the art that various changes in form and details may be made therein without departing from the spirit and scope of the invention. For example, it is expected that the benefits presented here are also applicable to the case with more than I relay. Additionally, although the above description was give with respect to relaying within a cellular communication systems, one of ordinary skill in the art will recognize that relaying as described above may occur in other types of communication systems. It is intended that such changes come within the scope of the following claims.

What is claimed is:

1. A method for relaying information in an ad-hoc network, the method comprising the steps of:

identifying a plurality of devices that can serve as relay devices;

identifying attributes for the plurality of devices, wherein the step of identifying attributes comprises the step of identifying attributes taken from the group consisting of whether the device is A/C powered, has a large battery reserve, is actively communicating, and whether the device is using real-time services;

based on the attributes, determining a device that will result in a best system performance if utilized as the relay device; and utilizing the device for relaying the information.

2. The method of claim 1 wherein the step of determining the device comprises the step of determining a device that has minimum effect on overall system battery consumption.

3. The method of claim 1 further comprising the step of:
   rank ordering the plurality of devices based on the attributes.

4. The method of claim 1 wherein the step of utilizing the device for relaying the information comprises the step of sending information to the device utilizing a first over-the-air protocol, causing the device to transmit the information to infrastructure equipment utilizing a second over-the-air protocol.

5. The method of claim 1 wherein the step of utilizing the device for relaying the information comprises the step of sending information to the device utilizing an ad-hoc over-the-air protocol, causing the device to transmit the information to infrastructure equipment utilizing a cellular over-the-air protocol.

6. An apparatus comprising:

logic circuitry utilized for identifying a plurality of devices that can serve as an ad-hoc relay, identifying a plurality of attributes for the identified devices, and choosing a device to act as the ad-hoc relay based on the identified attributes, wherein the device chosen maximizes system performance and wherein the attributes are chosen from the group consisting of whether the devices are A/C powered, have a large battery reserve, are actively communicating to infrastructure equipment utilizing the second over-the-air protocol, and using real-time services; and a transmitter for sending information to the device utilizing a first over-the-air protocol, causing the device to transmit the information to infrastructure equipment utilizing a second over-the-air protocol.

7. The apparatus of claim 6 wherein the logic circuitry comprises an ad-hoc networking module.

8. The apparatus of claim 6 wherein the first over-the-air protocol comprises an ad-hoc over-the-air protocol.

9. The apparatus of claim 6 wherein the first over-the-air protocol comprises an ad-hoc over-the-air protocol and the second over-the-air protocol comprises a cellular over-the-air protocol.

10. The apparatus of claim 6 wherein maximizing system performance comprises minimizing battery consumption for the system.

* * * * *